(12) United States Patent
Wong et al.

(10) Patent No.: US 11,415,758 B2
(45) Date of Patent: Aug. 16, 2022

(54) FIBER OPTIC CONNECTOR, SUBASSEMBLY AND METHOD OF MAKING

(71) Applicant: Senko Advanced Components, Inc., Marlborough, MA (US)

(72) Inventors: Kim Man Wong, Kowloon (HK); Jimmy Jun-Fu Chang, Worcester, MA (US); Kazuyoshi Takano, Tokyo (JP)

(73) Assignee: Senko Advanced Components, Inc., Hudson (MA)

( * ) Notice: Subject to any disclaimer, the term of this patent is extended or adjusted under 35 U.S.C. 154(b) by 0 days.

(21) Appl. No.: 17/007,831

(22) Filed: Aug. 31, 2020

(65) Prior Publication Data

US 2021/0063649 A1    Mar. 4, 2021

Related U.S. Application Data

(60) Provisional application No. 62/924,387, filed on Oct. 22, 2019, provisional application No. 62/893,424, filed on Aug. 29, 2019.

(51) Int. Cl.
*G02B 6/38* (2006.01)

(52) U.S. Cl.
CPC ......... *G02B 6/3874* (2013.01); *G02B 6/3878* (2013.01); *G02B 6/3885* (2013.01); *G02B 6/3887* (2013.01); *G02B 6/3888* (2021.05)

(58) Field of Classification Search
CPC .. G02B 6/3874; G02B 6/3878; G02B 6/3885; G02B 6/3887; G02B 6/3888
USPC .......................................................... 385/78
See application file for complete search history.

(56) References Cited

U.S. PATENT DOCUMENTS

| | | | |
|---|---|---|---|
| 6,669,377 B2 | 12/2003 | Barnes et al. |
| 6,985,665 B2 | 1/2006 | Baechtle |
| 7,281,859 B2 | 10/2007 | Mudd et al. |
| 8,376,629 B2 | 2/2013 | Cline et al. |
| 8,622,634 B2 | 1/2014 | Arnold et al. |
| 10,101,540 B2 | 10/2018 | Gregorski |
| 10,151,887 B2 | 12/2018 | de Jong et al. |

(Continued)

FOREIGN PATENT DOCUMENTS

| | | |
|---|---|---|
| WO | 2014206976 A | 12/2014 |
| WO | 2019126333 A1 | 6/2019 |

OTHER PUBLICATIONS

International Search Report and Written Opinion for PCT Application No. PCT/US2020/048766, dated Nov. 20, 2020.

*Primary Examiner* — Michael P Mooney

(57) ABSTRACT

A fiber optic connector includes a housing having an internal cavity and a front opening. A back post has an internal cavity, a front opening and a rear opening. The back post is operatively connected to the housing so that the internal cavity of the back post communicates with the internal cavity of the housing. At least two ferrules are disposed at least partially within the internal cavity of the housing and are exposed through the front opening of the housing. Each ferrule has a cylindrical shape and includes a flange. Each ferrule couples to an optical fiber. A fiber guide is coupled to each ferrule. Each fiber guide receives one of the optical fibers. Each fiber guide extends rearward from the ferrule. Each fiber guide extends in the internal cavity of the housing and the internal cavity of the back post. Each fiber guide is bent as the fiber guide extends rearward from the internal cavity of the housing to the internal cavity of the back post.

17 Claims, 12 Drawing Sheets

(56) References Cited

U.S. PATENT DOCUMENTS

| | | |
|---|---|---|
| 10,162,129 B2 | 12/2018 | Smith et al. |
| 10,495,824 B2 | 12/2019 | Rosson |
| 2003/0059168 A1* | 3/2003 | Connelly ............. G02B 6/3878 385/58 |
| 2016/0139355 A1 | 5/2016 | Petersen |
| 2019/0137694 A1 | 5/2019 | Murray et al. |
| 2020/0284998 A1* | 9/2020 | Higley ................ G02B 6/3825 |

* cited by examiner

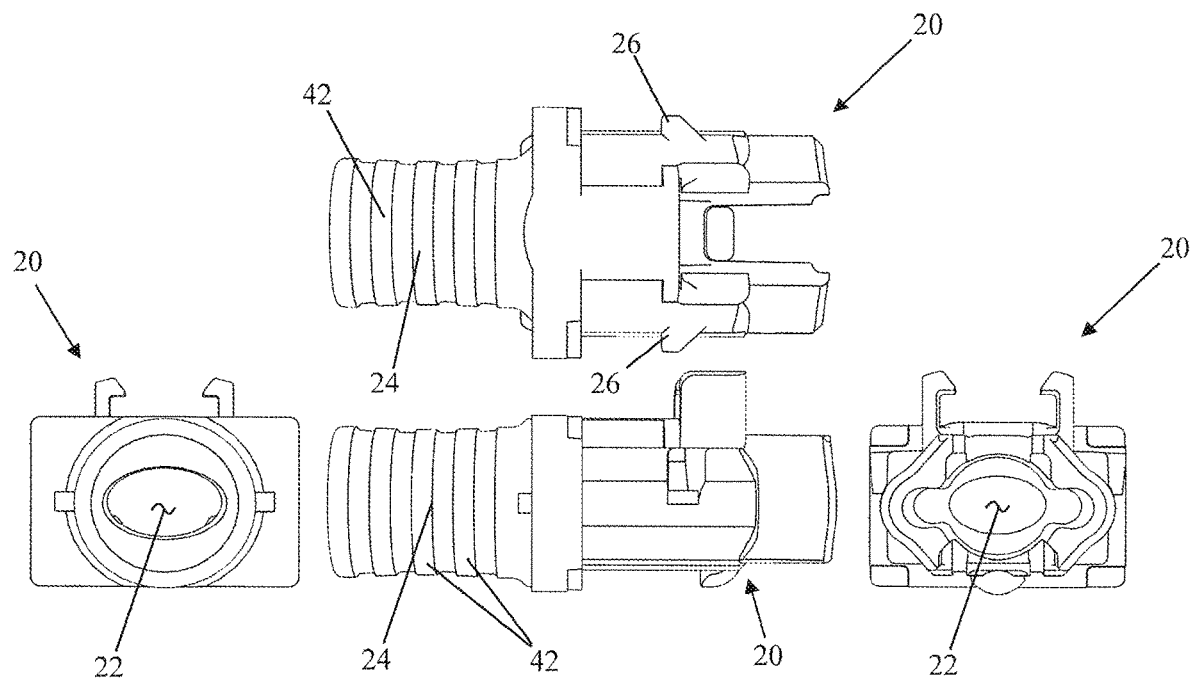
FIGS. 4A-D
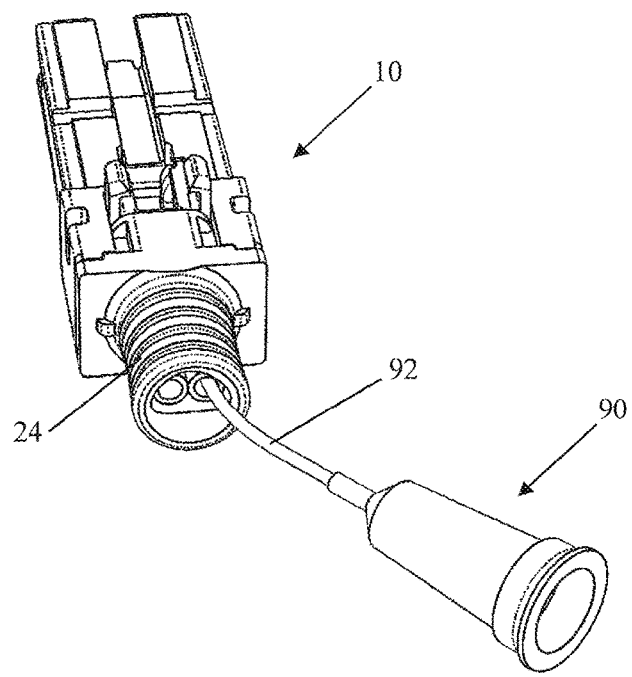
FIG. 5

FIBER OPTIC CONNECTOR, SUBASSEMBLY AND METHOD OF MAKING

CROSS-REFERENCE TO RELATED APPLICATION

This application claims priority to U.S. Provisional App. No. 62/893,424, filed Aug. 29, 2019, and U.S. Provisional App. No. 62/924,387, filed Oct. 22, 2019, the entireties of which are hereby incorporated by reference.

FIELD

The present disclosure generally relates to fiber optic connections, and, more specifically, to a fiber optic connector.

BACKGROUND

Optical connectors are used within optical communication networks to interconnect optical cables to optical devices or other optical cables. Optical connections typically involve two optical connectors connected together.

SUMMARY

In one aspect, a fiber optic connector comprises a housing, at least two optical ferrule assemblies supported by the unitary housing, and a back post having an open proximal end. A bias spring assembly is arranged to bias the at least two optical ferrule assemblies in a forward direction. A guide tube for each of the at least two optical ferrule assemblies extends from a proximal end of a respective one of the at least two optical ferrule assemblies to distal end of the fiber optic connector subassembly. The guide tubes extend substantially to the open proximal end of the back post thereby allowing optical fibers to be inserted into respective ones of the guide tubes at the proximal end of the back post, along the guide tubes and into respective ones of the at least two optical ferrule assemblies to form the fiber optic connector subassembly.

In another aspect, a method of assembling a pre-assembled fiber optic connector comprises mounting a ferrule subassembly with guide tube onto a connector housing. A bias spring is inserted over the ferrule subassembly and a back post over the spring and ferrule subassembly. A flexible cannula is inserted into the guide tube so that the cannula is guided by the guide tube through the back post and toward the ferrule subassembly. Epoxy is injected from the cannula into the ferrule subassembly for securing the optical fibers to form an optical communication path.

In another aspect, a fiber optic connector comprises a housing having an internal cavity and a front opening. A back post has an internal cavity, a front opening and a rear opening. The back post is operatively connected to the housing so that the internal cavity of the back post communicates with the internal cavity of the housing. At least two ferrules are disposed at least partially within the internal cavity of the housing and are exposed through the front opening of the housing. Each ferrule has a cylindrical shape and includes a flange. Each ferrule is configured to be coupled to an optical fiber. A fiber guide is coupled to each ferrule. Each fiber guide is configured to receive one of the optical fibers. Each fiber guide extends rearward from the ferrule. Each fiber guide extends in the internal cavity of the housing and the internal cavity of the back post. Each fiber guide is bent as the fiber guide extends rearward from the internal cavity of the housing to the internal cavity of the back post.

In another aspect, a fiber optic connector subassembly generally comprises a housing having an internal cavity and a front opening. A back post has an internal cavity, a front opening and a rear opening, and is operatively connected to the housing so that the internal cavity of the back post communicates with the internal cavity of the housing. At least two ferrules supported by the housing are in communication with the internal cavity of the housing and are exposed through the front opening of the housing. Each ferrule has a cylindrical shape and includes a flange. A fiber guide for each ferrule extends away from the ferrule into the internal cavity of the back post. The fiber guides are bent as they extend from the internal cavity of the housing into the internal cavity of the back post for use in guiding an optical fiber to the ferrule.

In another aspect of the invention, the optical fibers are prepared and inserted their respective guide tubes or fiber guides. This dual or simultaneous insertion of the pre-prepared optical fibers helps reduce substantially optical fiber breakage. As an improvement, reduced handling of the optical fibers helps prevent breakage including fracturing of the optical fiber when the user may over bend the optical fiber attempting to insert the second optical fiber within the guide tube after the first optical fiber is inserted. Fracturing the optical fiber increases loss of light signal into the cladding, and increase internal reflection due to internal fracturing decreases signal strength, and leading to lost information in the form of a light signal.

In another aspect, the guide tubes extend beyond the most distal end of the back post opening. By extending the tubes, a leading tip of a flexible cannula is prevented from touching the edge of the tube or just inside the opening of the tube. The flexible cannula delivers epoxy or glue that if deposited near the guide tube opening that receives the optical fiber, and due to the optical fiber thickness of 600 nm to 900 nm, and the fibers flexibility, even the slightest smudge of epoxy can interfere with the insertion of an optical fiber within the guide tube opening. A guide tube inside diameter is slightly larger than the outside diameter of the optical fiber between 600 nm to 900 nm. For the 600 nm optical fiber an additional jacket is placed about the optical fiber.

In another aspect, the ferrule assembly, as described below, is made up of a ferrule with a bore configured to receive the optical fiber inserted within and along the, guide tube. The ferrule assembly has a multi-sided flange that secures the ferrule assembly within the preassembled inner body. Opposite the ferrule, or distal of multi-sided flange is a stepped flange with a rib or circumferential ring protruding out from the stepped flange outer surface. The rib is a distance "D" from the most distal end of the multi-stepped flange portion to help prevent the flexible cannula from getting caught during insertion and prior to releasing epoxy within a bore of the ferrule. The rib secures one end of the guide tube after the guide tube is flared with a tool to slightly expand the guide tube to a predetermined inner diameter. Also, the rib provides a retention surface a bias spring to be retained during assembly. The bias springs typically 6 mm in length and 2.4 mm in diameter, which is small and difficult to handle. After installed, the bias spring could easily fall off increasing connector failure rate during assembly.

In another aspect, has a raised surface to separate the guide tubes. With round backpost the guide tubes may shift and during assembly, the first optical fiber for ferrule A maybe receive the second optical fiber for ferrule B, which would render the connector defective after testing, as the epoxy was cured securing the optical fibers into the incorrect ferrule resulting in a connector with improper polarity.

In a further aspect, a method of making a fiber optic connector generally comprises providing a housing having an internal cavity, ferrules supported by the housing and in communication with the internal cavity of the housing, the ferrules each being cylindrical in shape and having a flange, and fiber guides connected to the ferrules and extending away from the ferrules to a location proximate a rear opening of the fiber optic connector. A flexible cannula is inserted into one of the fiber guides so that the cannula is deflected by and follows the fiber guide toward the ferrule. Material is injected into the fiber guide.

Other objects and features of the present disclosure will be in part apparent and in part pointed out hereinafter.

BRIEF DESCRIPTION OF THE DRAWINGS

FIGS. 4A-D are a top view, a rear view, a side view and a front view thereof;

FIG. 5 is a perspective of a syringe filling the fiber guide of the fiber optic connector with epoxy;

Corresponding reference characters indicate corresponding parts throughout the drawings.

DETAILED DESCRIPTION

Figure 1:
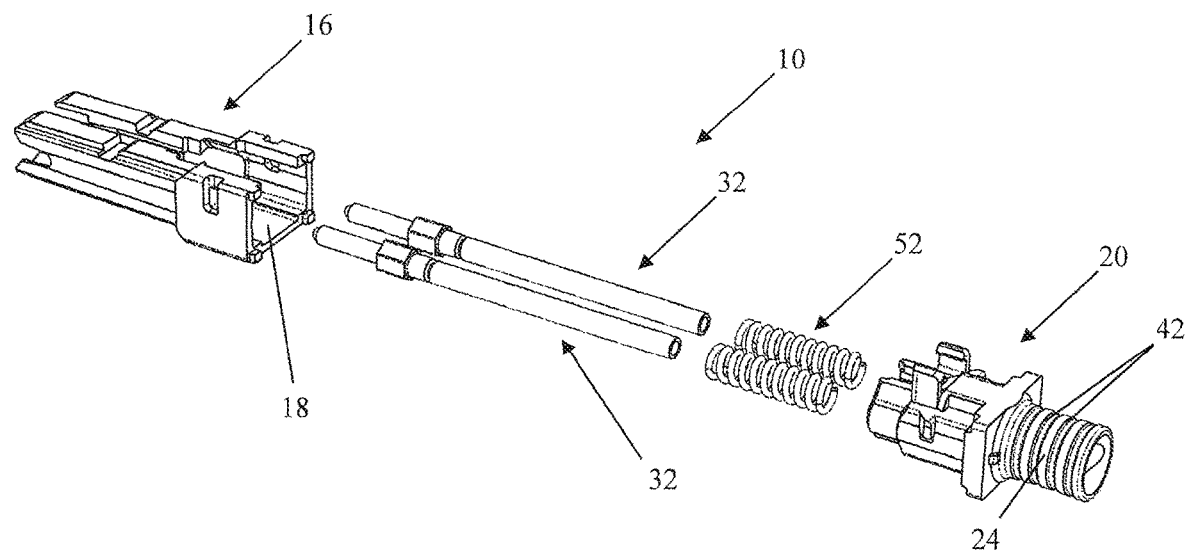
FIG. 1 is an exploded perspective of a fiber optic connector according to one embodiment of the present disclosure.

Referring to FIGS. 1-8, one embodiment of a fiber optic connector according to the present disclosure is generally indicated at reference numeral 10. The fiber optic connector 10 (e.g., a first fiber optic connector) forms a fiber optic connection with a second fiber optic connector or adapter (not shown) to form an optical connection that enables communication between different fiber optic components (e.g., cables, devices, etc.) in an optical communications network. The fiber optic connector 10 is to fiber optic cable 12. Each fiber optic cable 12 may have one or more optical fibers 14, such as two optical fibers. In the illustrated embodiment, the fiber optic connector 10 is a male fiber optic connector configured to mate with (e.g., be inserted in) the female fiber optic connector. Other configurations of the fiber optic connector 10 are within the scope of the present disclosure. For example, the fiber optic connector 10 can be a female fiber optic connector configured to mate (e.g., receive) a male fiber optic connector. In another example, the connector could make electrical or other types of connections instead of or in addition to an optical connection.

Figure 8:
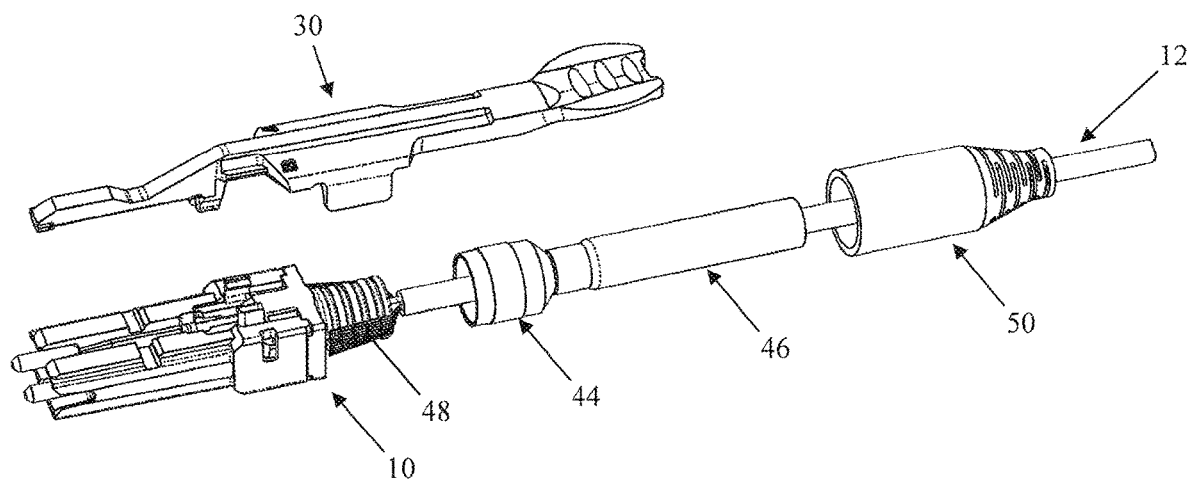
FIG. 8 is an exploded perspective of a fiber optic connector assembly including the fiber optic connector.

The fiber optic connector 10 includes a housing (e.g., connector housing). In this embodiment, the housing comprises a proximal or front housing 16 and a proximal or rear housing 20, The front housing 16 includes (e.g., defines) an internal cavity 18 (e.g., a longitudinal bore). The front housing 16 has a front or proximal opening (broadly, at least one) and a rear or proximal opening (broadly, at least one), both of which are in communication with the internal cavity 18. In the illustrated embodiment, the fiber optic connector 10 connects two optical fibers 14 of the fiber optic cable 12 to make two fiber optic connections. Accordingly, the front housing 16 in the illustrated embodiment has two front openings and a rear opening. The front housing 16 has proximal and distal ends. The rear housing 20 (e.g., back body) defines an internal cavity 22. The rear housing 20 has a front or distal opening and a rear or proximal opening, both of which are in communication with the internal cavity. Preferably, the rear housing 20 includes only one proximal opening, one internal cavity and one front opening. Thus, the two optical fibers 14 merge into the same internal cavity 22 of the rear housing 20 as the optical fibers extend from the front housing 16 through the rear housing. The rear housing 20 has proximal and distal ends. The rear housing 20 includes a back post 24. In this embodiment, the back post 24 is generally a round tube (e.g., has a generally circular cross-sectional shape). The back post 24 defines the proximal or rear end of the rear housing 20 and the proximal opening of the rear housing. The back post 24 also defines at least a portion of the internal cavity 22. The rear housing 20 is connected to the front housing 16. When connected together, the internal cavities 18, 22 of the front and rear housings 16, 20 are in communication (e.g., open communication) with one another (e.g., the proximal opening of the rear housing is aligned with the proximal opening of the front housing). In other words, the internal cavities 18, 22 combine to form a single internal cavity of the fiber optic connector 10. Accordingly, the back post 24 is operatively coupled to the front housing 16 so that the internal cavity 22 of the back post communicates with the internal cavity 18 of the front housing. The rear housing 20 includes at least one (e.g., two) detents or catches that are disposed in corresponding openings in the front housing 16 to secure the two housings together. The rear housing 20 also includes a pull tab latch 28 configured to couple to a pull tab 30 (FIG. 8). The front and rear housings 16, 20 form the housing (with an internal cavity) of the fiber optic connector 10.

The back post 24 is configured to attach to the fiber optic cable 12. The back post 24 may include one or more ribs 42 on the exterior thereof to secure the fiber optic cable 12 (FIGS. 4A and 4C). To attach the fiber optic cable 12 to the fiber optic connector 10, a crimp ring 44 (FIG. 8) may be used. An outer sheath 46 (FIG. 8) may extend distally from the crimp ring 44, which the fiber optic cable 12 extending through the outer sheath. In one embodiment, the outer sheath 46 is a heat shrink tube. The fiber optic cable 12 may include one or more reinforcing members 48 (e.g., strands, strips, etc.), such as strands of nylon, that are crimped between the crimp ring 44 and the back post 24 to secure the fiber optic cable 12 to the fiber optic connector 10. A cover 50 (e.g., strain relief boot or uniboot) may also be used to cover the crimp ring 44 and back post 24 (broadly, the back post 24 is configured to secure a strain relief boot to the fiber optic connector 10).

Figure 2:
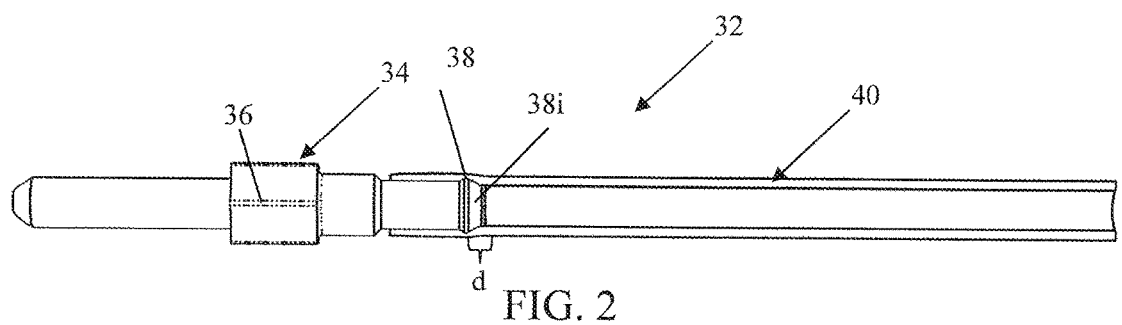
FIG. 2 is a side view of a ferrule and a fiber guide (shown in section) of the fiber optic connector.
Figure 3:
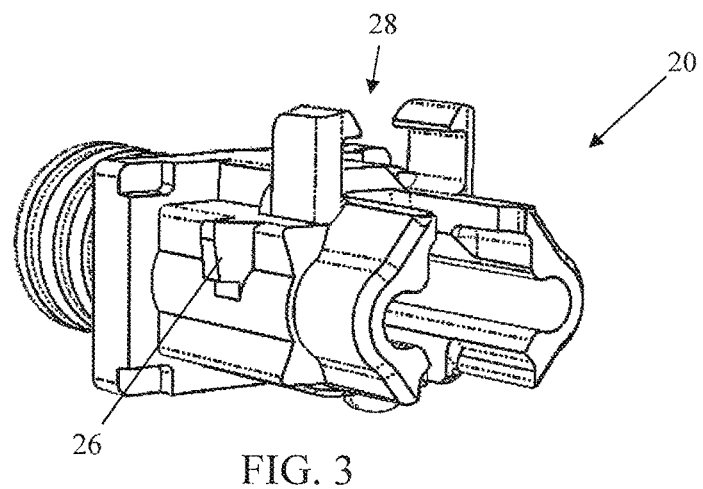
FIG. 3 is a perspective of a rear housing of the fiber optic connector.

The fiber optic connector 10 includes a ferrule assembly 32 (broadly, at least one). The ferrule assembly 32 (e.g., a pre-assembled inner body) is disposed in the internal cavity 18 of the front housing 16 and supported by the front housing. The ferrule assembly 32 is also disposed in the internal cavity 22 of the rear housing 20 (e.g., the internal cavity is sized and shaped to receive the ferrule assembly. In the illustrated embodiment, fiber optic connector 10 includes two ferrule assemblies 32, each disposed at least partially in the internal cavity 18 of the front housing 16 and in the internal cavity 22 of the rear housing 20 (broadly, at least partially within the single internal cavity of the housing of the fiber optic connector). Each ferrule assembly 32 includes a ferrule 34. The ferrule is configured to form the optical connection with the other fiber optic connector or adapter. In the illustrated embodiment, the ferrule 34 is an LC-type ferrule, although other types of ferrules, such as SC-type ferrules, are within the scope of the present disclosure. The ferrule 34 is connected to the optical fiber 14. The optical fiber 14 extends through the ferrule 34 and proximally from the ferrule. The ferrule 34 is at the distal end of the ferrule assembly 32. Each ferrule 34 is at least partially disposed within the internal cavity 18 of the front housing 16. Each ferrule 34 is exposed (e.g., extends or is accessible) through one of the proximal openings of the front housing. The ferrule 34 has a generally cylindrical shape. The ferrule 34 includes a flange 36 and a circumferential barb or rib 38 (FIG. 2). Rib 38 is a distance "d" from the most distal end of flange 36, and rib 38 has an inclined surface 38i that accepts flared end of guide tube 40 over rib 38. Rib 38 helps secure guide tube 40 about flange, and rib 38 holds bias spring 52 during assembly.

Each ferrule assembly 32 includes a fiber guide 40 or guide tube. The fiber guide 40 defines a lumen that receives one of the optical fibers 14 (e.g., the optical fiber extends through the lumen). In the illustrated embodiment, the fiber guide 40 comprises a tube (e.g., a guide tube). Preferably, the tube is flexible. For example, the tube maybe made from a flexible material such as polytetrafluoroethylene (PTFE), although other materials are within the scope of the present disclosure. The fiber guide 40 (e.g., tube) is attached to the ferrule 34 (e.g., a proximal end thereof). Specifically, the fiber guide 40 extends over a portion of the ferrule 34 and is held in place by the rib 38. The fiber guide 40 extends proximally from (e.g., away from) the ferrule 34 toward the rear opening defined by the back post 24 (e.g., the proximal end of the rear housing 20). Accordingly, the fiber guide 40 extends in the internal cavities 18, 22 of the front and rear housings 16, 20. Each fiber guide 40 guides one of the optical fibers 14 from the ferrule 34 toward (e.g., to) the rear opening of the back post 24. The fiber guide 40 guides the optical fiber 14 from the internal cavity 22 of the back post 24 to the internal cavity 18 of the front housing 16 and into the ferrule 34. The fiber optic cable 12 (e.g., optical fibers 14) enters the fiber optic connector 10 through the rear opening of the back post 24.

Each fiber guide 40 may include one or more bends (e.g., may be bent) as the fiber guide extends from the internal cavity 18 of the front housing 16 to the portion of the internal cavity 22 defined by the back post 24 of the rear housing 20. The one or more bends of each fiber guide 40 bring the two fiber guides together within the interior cavities 18, 22 of the front and rear housing 16, 20 (specifically, together in the back post 24). As shown, the two ferrules 34 are spaced apart but the optical fibers 14 connected to each ferrule are part of the same fiber optic cable 12. Accordingly, the one or more bends of each fiber guide 40 moves or guides the optical fibers 14 apart (as they extend proximally) from the single fiber optic cable 12 to the two ferrules 34. Preferably, each fiber guide 40 is pre-bent (e.g., formed with at least one bend). Accordingly, at rest, each fiber guide 40 is preferably non-linear in its extent. However, the fiber guides 40 do not have to be pre-formed with bends. The fiber guides 40 are flexible and may simply flex or bend as needed to fit in the internal cavities 18, 22. The fiber guide 40 also permits blind mating of the optical fiber 14 with the ferrule 34. The optical fiber 14 can be inserted distally into the proximal end (e.g., open rear end) of the lumen of the fiber guide 40. As the optical fiber 14 is moved distally in the fiber guide 40, the fiber guide 40 guides the optical fiber to the ferrule 34. This makes it easier to connect the fiber optic connector 10 to the end of the fiber optic cable 12.

Each ferrule assembly 32 also includes a spring 52. The spring 52 is a coil spring mounted on one of the fiber guides 40. The spring 52 biases the ferrule 34 distally (e. in a distal direction). The two springs 52 may be broadly and collectively considered a "bias spring assembly." The spring 52 defines an interior through which the fiber guide 40 extends. By extending in (e.g., through) the spring 52, the fiber guide 40 limits the lateral movement of the spring (as the spring compresses and expands), reducing the spring rattle which can cause damage to the fiber optic connector 10. The spring 52 engages the ferrule 34 and the housing of the fiber optic connector 10. Specifically, a distal end of each spring 52 engages the flange 36 of the ferrule 34 and a proximal end of each spring engages the distal end of the rear housing 20. As a result, the spring 52 pushes or biases the ferrule 34 in a distal direction, until the flange 36 of the ferrule engages the front housing 16 (limiting further distal movement). The spring 52 pushes the ferrule 34 distally to help maintain the engagement of the ferrule with the other fiber optic connector or adapter to which the fiber optic connector 10 is connected. Due to proximal movement of the ferrule 34 caused by the engagement with the other fiber optic connector or adapter, the flange 36 is no longer engaged with the front housing 16 and the spring 52 can now bias or push the ferrule 34 against the other fiber optic connector or adapter to help maintain the integrity of the optical connection therebetween.

In one method of assembling the fiber optic connector 10, first the ferrule assemblies 32 are inserted into the front housing 16. The ferrules 34 are inserted into the interior cavity 16 and positioned until they extend distally through the front opening of the front housing 16 (e.g., until the flanges 36 engage the front housing). The fiber guides 40 may be connected to the ferrules 34 before or after they are placed in the front housing 16. Also, if not on the fiber guides 40 already, the springs 52 are then inserted (e.g., slid) distally over the fiber guides into engagement with the flanges 36. After, the front housing 16 is attached to the rear housing 20. The rear housing 20 is inserted into the front housing 16, with the distal ends of the fiber guides 40 moving through the distal opening and into the interior cavity 22 of the rear housing. As the rear housing 20 is attached to the front housing 16. the rear housing compresses the springs 52. In addition, the bends in the fiber guides 40 bring proximal portions of the fiber guides together such that are next to one another and extend into (and possibly through) the back post 24. Moreover, the flexibility of the fiber guides 40 allows the fiber guides to move and position themselves within the interior cavities 18, 22 of the front and rear housings 16, 20. The detents 26 secure the rear housing 20 to the front housing. When the fiber optic connector 10 is assembled, the pull tab latch 28 is generally secured (e.g., disposed) in a cut-out or opening near (e.g., at) the proximal end of the front housing 16. The pull tab latch 28 generally extends outward from the front housing 16.

Figure 6:
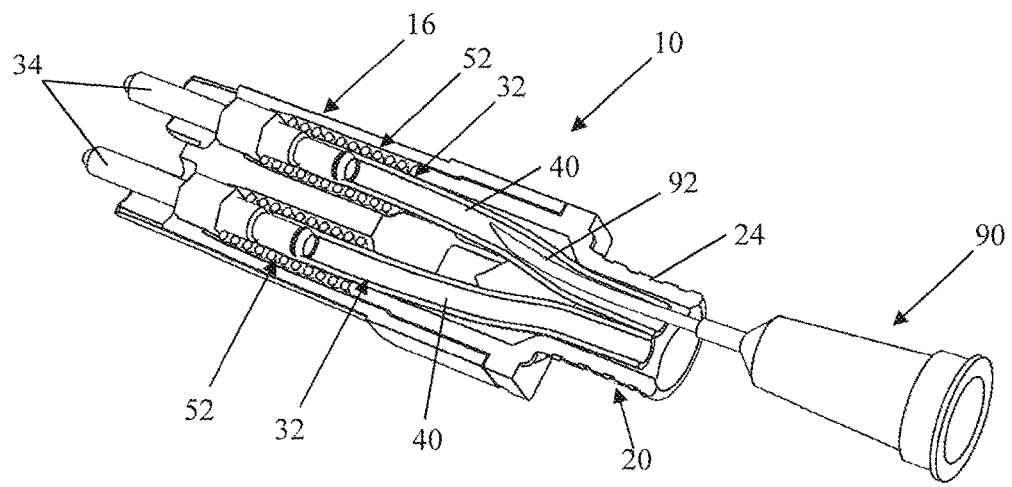
FIG. 6 is a longitudinal section thereof.
Figure 7:
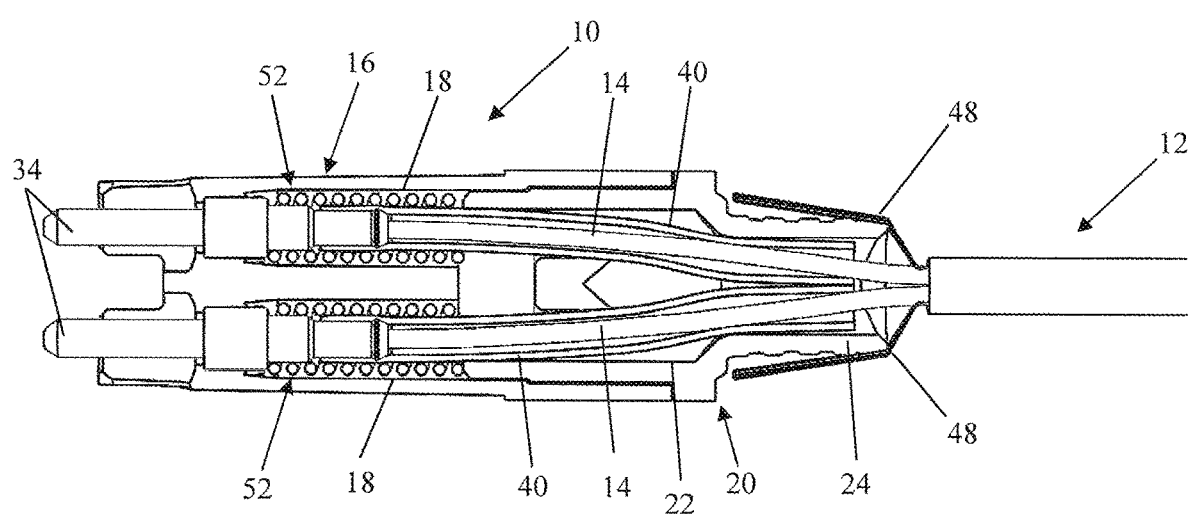
FIG. 7 is a longitudinal section of the fiber optic connector.

After the fiber optic connector 10 is assembled, it can be attached to the end of the fiber optic cable 12. To ultimately secure the optical fiber 14 in the fiber guide 40, a binding material is inserted into the fiber guide. The binding material may be any suitable material, such as epoxy. Referring to FIGS. 5 and 6, to inject the binding material into the fiber guides 40, the tip 90 of a syringe (only a portion of the syringe being shown) containing the binding material is inserted into the open rear end (e.g., an injector port) of each fiber guide. In the illustrated embodiment, the fibers 14 have not yet been installed in the fiber optic connector 10 when the binding material is introduced. The tip 90 of the syringe comprises a flexible cannula 92 that extends into the lumen of the fiber guide 40. The flexible cannula 92 follows (e.g., is guided by) the fiber guide 40 toward the ferrule 34. Because the fiber guide 40 has a non-linear shape, the flexible cannula 92 is deflected or bent by the fiber guide (e.g., the cylindrical wall thereof) as the flexible cannula is inserted into and extends within the fiber guide. The syringe then ejects the binding material into the lumen of the fiber guide 40 to substantially fill the fiber guide.

A jacket of the cable 12 is stripped back and any fiber cladding is removed. As shown, the two fibers 14 are inserted simultaneously into openings (e.g., ports) a rearward ends of respective ones of the fiber guides 40. The fibers 14 are then simultaneously driven distally through the material previously injected into the fiber guides 40 and into passages in the ferrules 34, to the distal tips of the ferrules. The proximal ends of the ferrules 34 can be formed with a funnel shape to facilitate reception into the ferrule passages. Thus, it may be seen that a blind mating of the fibers 14 with the ferrules 34 already installed in the connector subassembly is achieved. The open proximal ends of the fiber guides 40 can be considered "ports." Each fiber guide 40 guides the optical fiber 14 to the ferrule 34. The binding material generally encases (e.g., surrounds) the one or more optical fibers 14 to secure the cables to the fiber guide 40 (and the ferrule 34) when cured.

After the one or more optical fibers 14 are secured to the fiber optic connector 10, the rest of the fiber optic cable 12 can be secured to the fiber optic connector. The one or more reinforcing members 48 (e.g., Kevlar® strands from the cable 12) may be positioned such that they overlap the back post 24. Then a crimp ring 44 may be positioned (e.g., slide) over the reinforcing members 48 and back post and attached to the fiber optic connector. The crimp ring 44 is compressed or crimped, thereby deforming the crimp ring and reinforcing members 48 against the back post 24. The cover 50 may then be positioned (e.g., slide) over the back post 24, crimp ring 44 and sheath 46. Because the crimp ring 44, sheath 46 and cover 50 generally surround the fiber optic cable 12. these component may be inserted onto the fiber optic cable before the optical fibers 14 are attached to the fiber optic connector 10. The pull tab 30 may then be attached to the fiber optic connector 10 via the pull tab latch 28.

Figure 9:
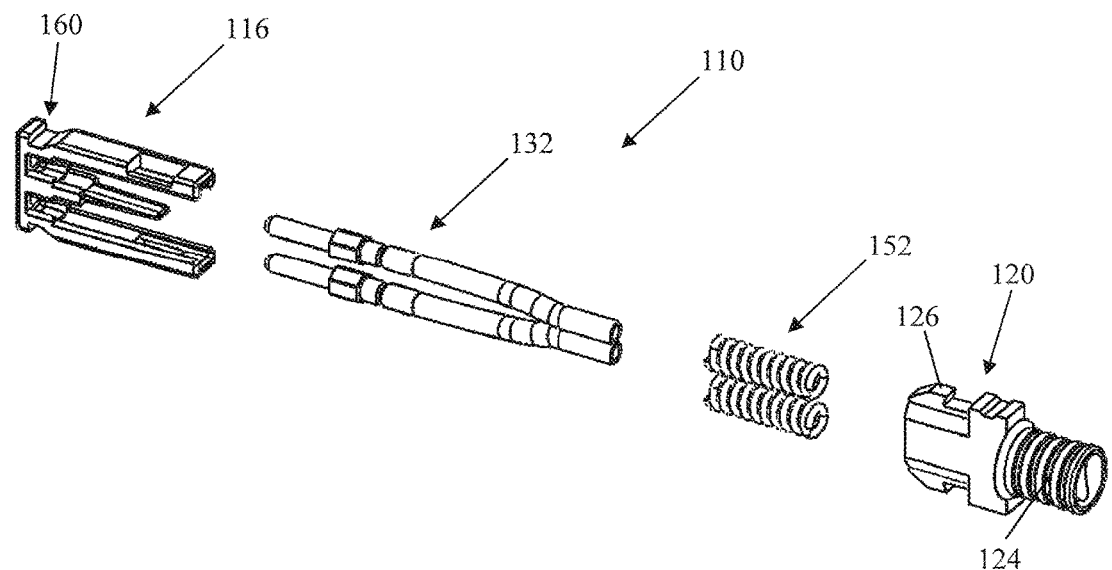
FIG. 9 is an exploded view of another embodiment of a fiber optic connector according to the present disclosure.
Figure 10:
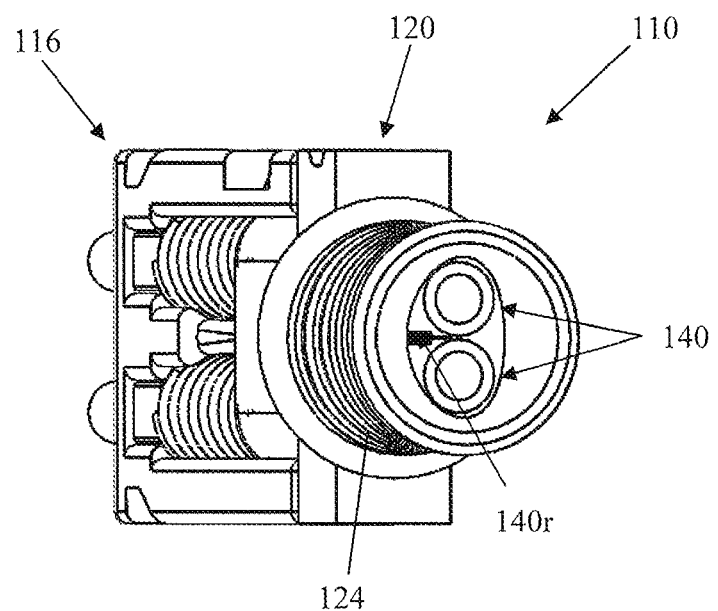
FIG. 10 is a rear perspective thereof.
Figure 11:
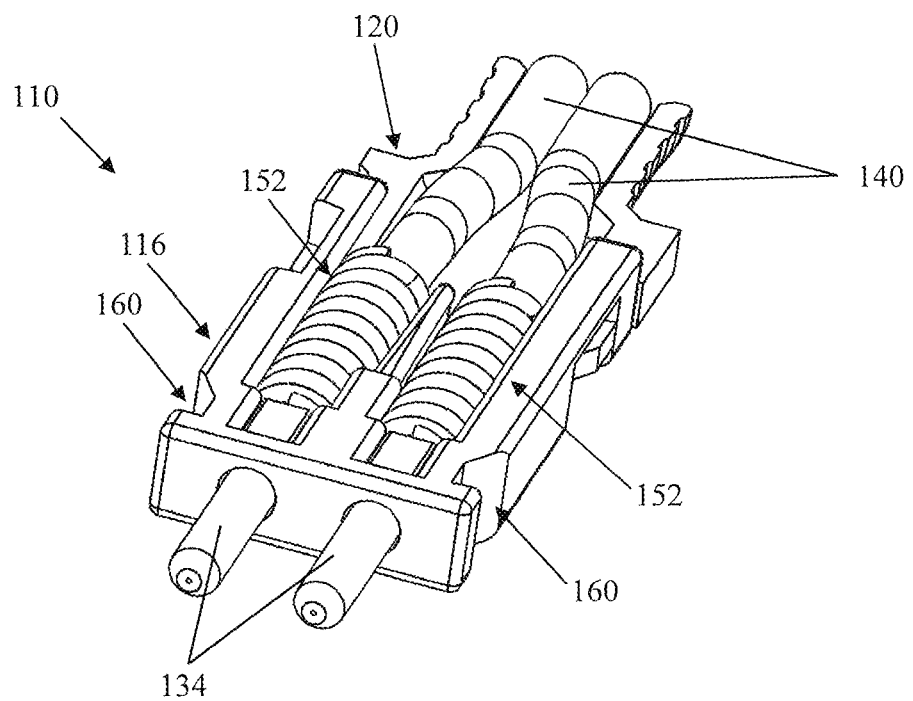
FIG. 11 is a front perspective thereof.
Figure 12:
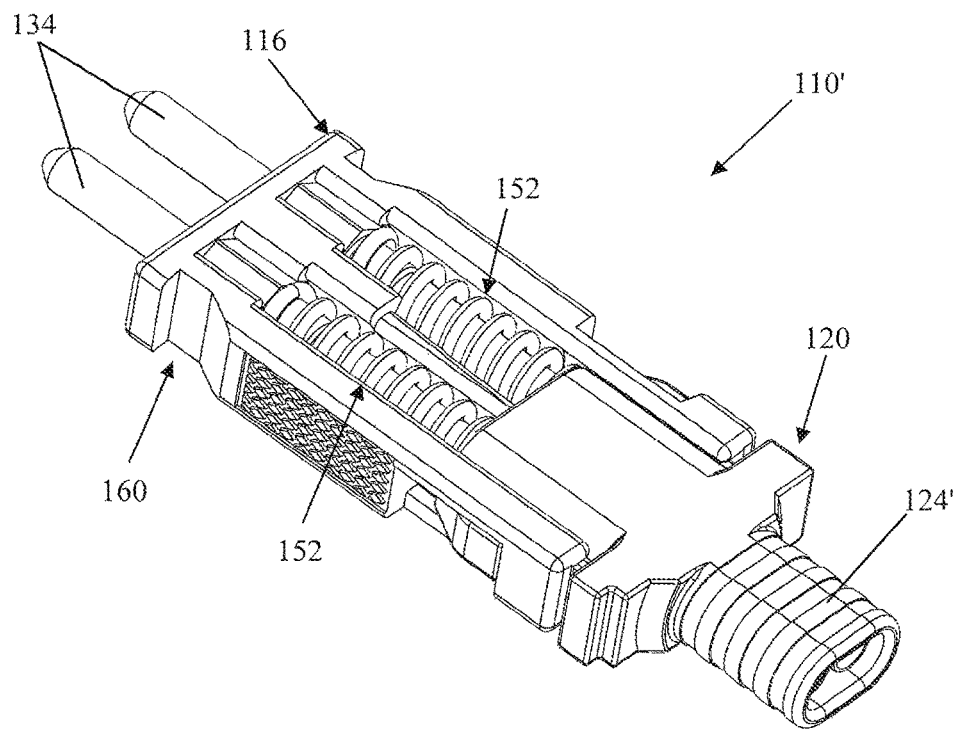
FIG. 12 is a top and rear perspective thereof.
Figure 13:
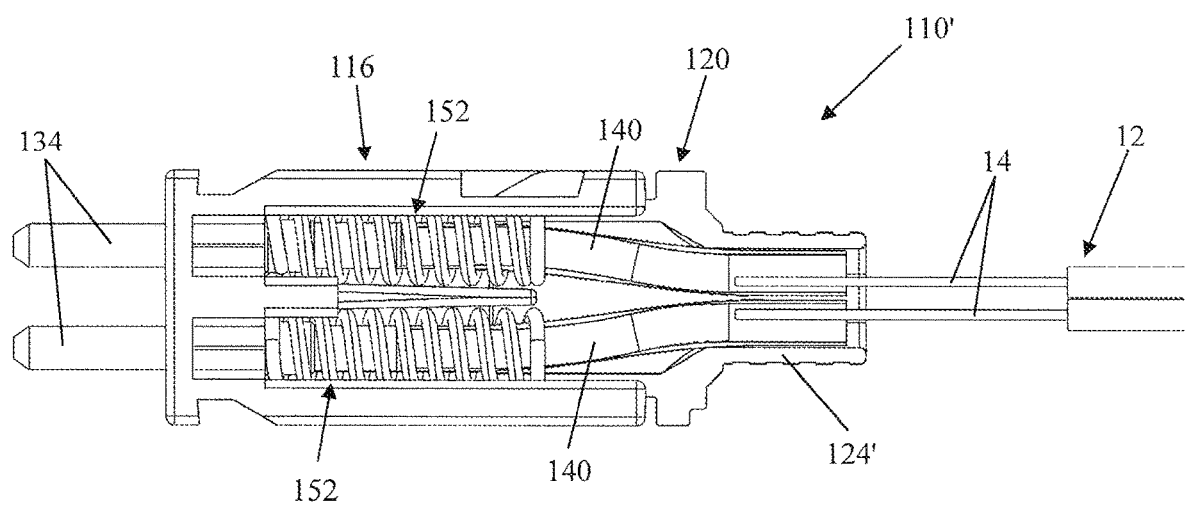
FIG. 13 is a side view showing a back post in longitudinal section.
Figure 14:
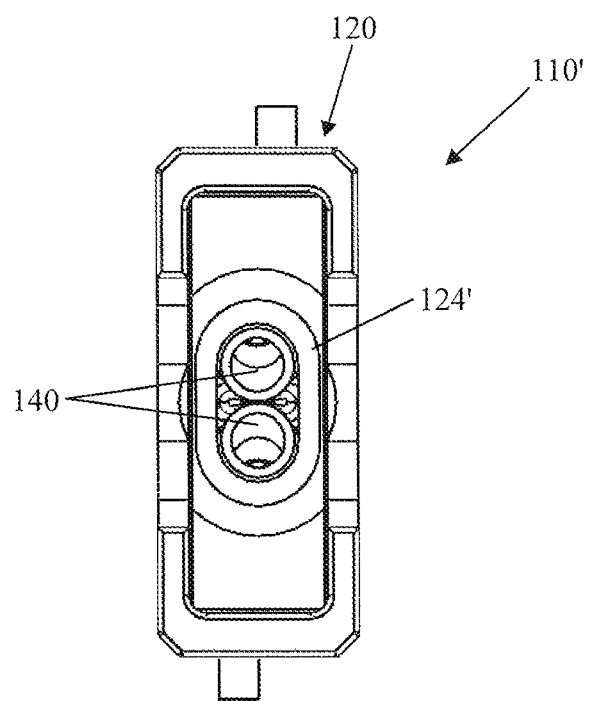
FIG. 14 is a rear view thereof.
Figure 15:
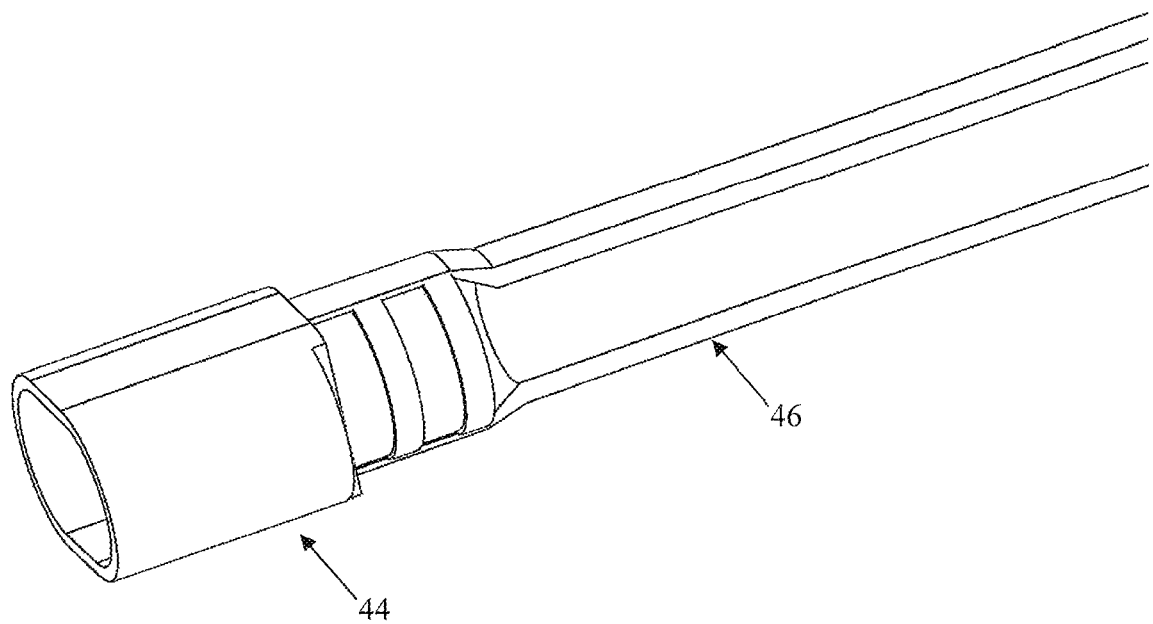
FIG. 15 is a perspective of a crimp ring and outer sheath.

Referring to FIGS. 9-11, another embodiment of a fiber optic connector according to the present disclosure is generally indicated by reference numeral 110. Fiber optic connector 110 is generally analogous to fiber optic connector 10 and, thus, for ease of comprehension, where similar, analogous or identical parts are used, reference numerals "100" units higher are employed. Accordingly, unless clearly stated or indicated otherwise, the above descriptions regarding fiber optic connector 10 also apply to fiber optic connector 110. In FIG. 10, instead of an oblong back post opening, raised surface 140r maybe provided to keep separate the two guide tubes. This would allow for a round back post instead of oblong.

The main difference between fiber optic connector 110 and fiber optic connector 10 is the configuration of the front and rear housings 116, 120. The front and rear housings 116, 120 have a minimal (e.g., narrow, slim) configuration in order to minimize the overall size (e.g., width) of the fiber optic connector 110. To achieve this minimal configuration, the front housing 116 has open sides (FIG. 9). The open sides are in communication with the interior cavity 116 of the front housing. As a result of the open sides, the springs 152 are generally visible. The springs 152 may be flush with the opposing side surfaces of the front housing 116 or even extend slightly outward of the front housing 116 by extending through the open sides. Eliminating the portion of the front housing 116 that typically surrounds the sides the springs 152, allows the overall width of the front housing to be reduced. Moreover, since each spring 152 surround the ferrule 134 (e.g., a portion thereof) and the fiber guide 140 (e.g., a portion thereof), the spring still provides a level of protection for the ferrule and fiber guide, typically provided by the front housing. The narrow configuration of the front housing 16 is generally matched by the rear housing 120. However, the rear housing 120 does not have open sides and fully surrounds (e.g., encases) the portions of the ferrule assemblies 132 extending therein. However, the opposing sides (e.g., side surfaces) of the rear housing 120 are flush with the opposing sides (e.g., side surfaces) of the front housing 116. Similar to fiber optic connector 10, the front housing 116 of fiber optic connector 110 includes opposite openings or slots near (e.g., adjacent to) the proximal end of the front housing. The openings receive the detents 126 near (e.g., adjacent to) the distal end of the rear housing 120 to secure the front and rear housings together. Moreover, in this embodiment, the front housing 116 includes opposite recesses 160 near (e.g., adjacent to) to the distal end of the front housing. The recesses 160 are configured to connect to an adapter (not shown) to attach the fiber optic connector 10 to the adapter. Specifically, the recesses 160 are configured to receive latch hooks (not shown) of the adapter.

Figure 16:
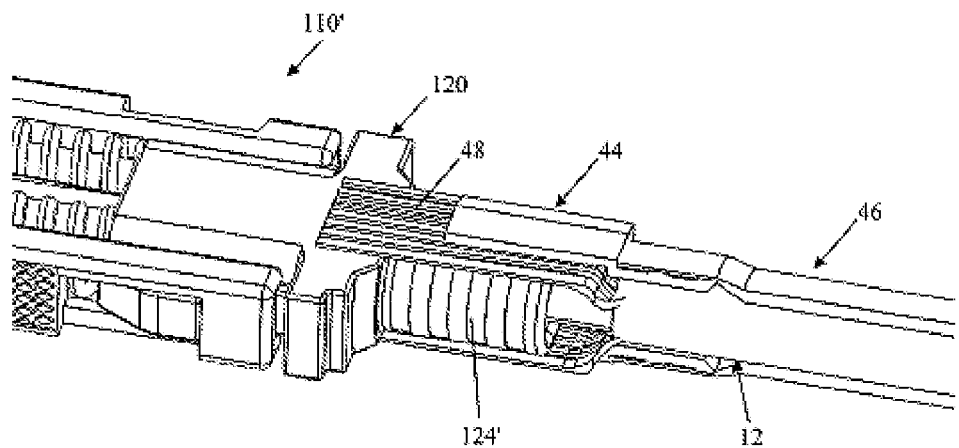
FIG. 16 is a perspective of the crimp ring and outer sheath of FIG. 15 being pushed onto the fiber optic connector similar to FIG. 8.

Referring to FIGS. 12-16, an alternative embodiment of fiber optic connector 110 is generally indicated by reference numeral 110'. Fiber optic connector 110' is generally the same (e.g., identical) to fiber optic connector 110 except that the configuration of the back post 124' of fiber optic connector 110' is further minimalized to match the overall minimal configuration of the fiber optic adapter 110, 110'. In this embodiment, the back post 124' has an oblong shaped cross section. As a result, the portion of the internal cavity 122 defined by back post 124 has an oblong shaped cross section. Likewise, the rear opening of the rear housing 120 defined by the back post 124' has an oblong shaped cross section. The oblong shape helps keep the two guide tubes in position. Since each guide tube is connected to a first ferrule A and a second ferrule B, during assembly if the guide tubes should shift, the first optical fiber intended for ferrule A could be inserted into second ferrule 13, and the connector would not receive nor transmit an optical signal or defective. The back post 124' includes opposing side surfaces (e.g., flats) that are generally flat and planar, which reduces the overall dimensions (e.g., width) of the back post (broadly, of the fiber optic connector 110'). FIG. 16 shows the fiber optic cable 12, crimp ring 44' and outer sheath 46' attached to fiber optic connector 110'. The crimp ring 44 has an oblong, shape corresponding to the shape of the back post 124'. As shown, when the crimp ring 44 is crimped on the back post 124' of the fiber optic connector 110', the crimp ring confirms to shape of the back post. Otherwise, fiber optic connectors 110, 110' are generally the same and, thus, the above descriptions regarding fiber optic connector 110 also apply to fiber optic connector 110'.

Figure 17:
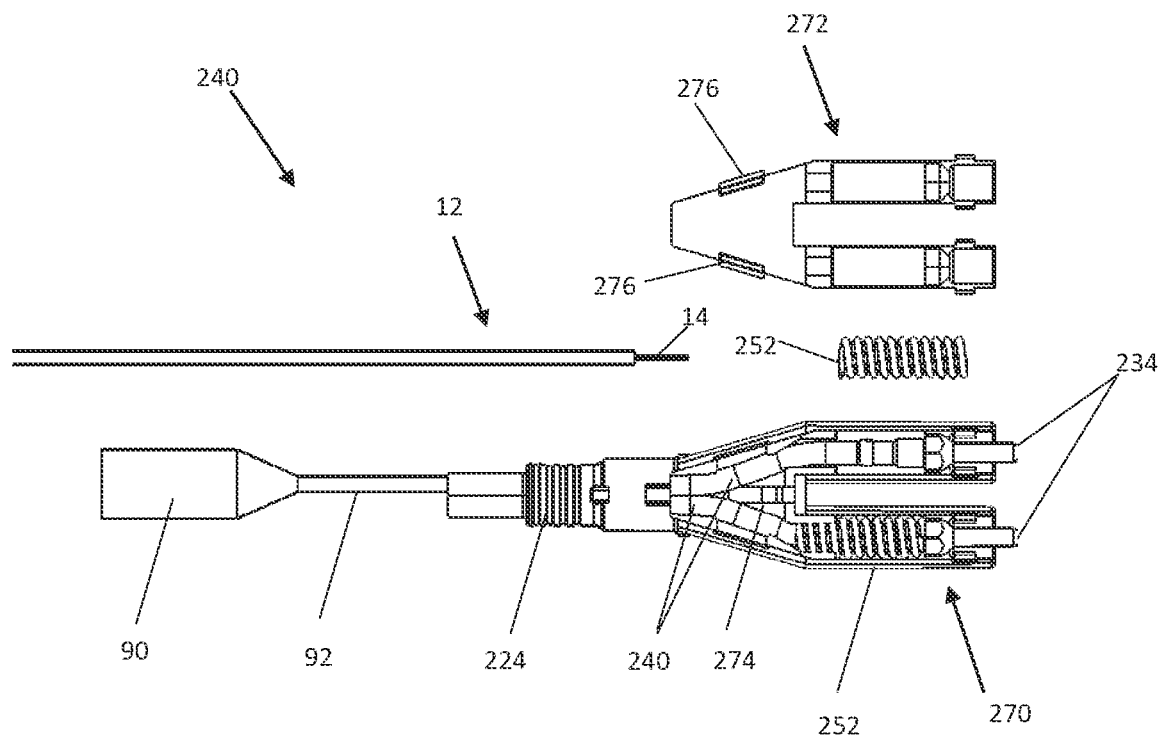
FIG. 17 is a photograph of another embodiment of a fiber optic connector according to the present disclosure, the fiber optic connector being partially assembled.
Figure 18:
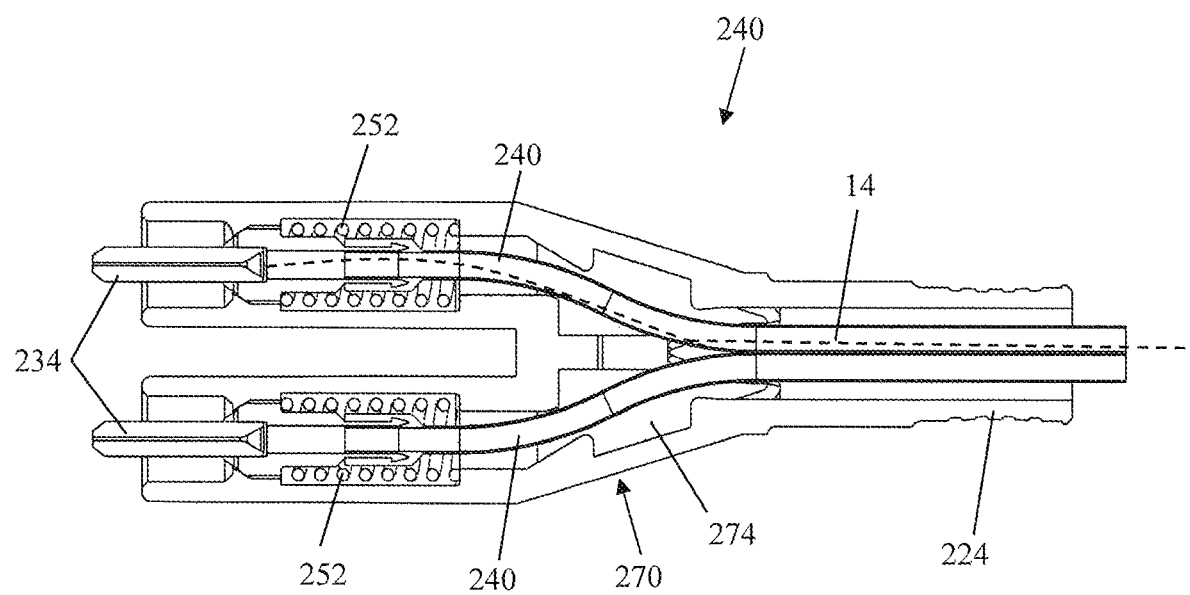
FIG. 18 is a cross section of the fiber optic connector of FIG. 17.

Referring to FIGS. 17 and 18, another embodiment of a fiber optic connector according to the present disclosure is generally indicated by reference numeral 210. Fiber optic connector 210 is generally analogous to fiber optic connector 10 and, thus, for ease of comprehension, where similar, analogous or identical parts are used, reference numerals "200" units higher are employed. Accordingly, unless clearly stated or indicated otherwise, the above descriptions regarding fiber optic connector 10 also apply to fiber optic connector 210.

The fiber optic connector 210 has different housing configuration. In this embodiment, the fiber optic connector 210 has a first side housing 270 and a second side housing 272. The first and second side housings 270, 272 couple together and extend longitudinally along the length of the fiber optic connector 210. Together, the first and second side housings 270, 272 define the distal openings through which the ferrules 34 extend through and the internal cavity 274 where the fiber guides 240 are disposed. The internal cavity 274 generally has the same shape as the combined internal cavities of 18, 22 of the fiber optic connector 10. In this embodiment, the first side housing 270 includes the back post 224. The second side housing 272 includes detents 276 to attach (e.g., snap) the second side housing to the first side housing 270. in the illustrated embodiment, the majority if the internal cavity 274 is defined by the first side housing 272 with the second side housing 274 generally being a cover with closes the open side of the first side housing through which all, the components are inserted into the internal cavity through. In this embodiment, the back post 224 is operatively connected to the front housing (i.e., the front portion of side housings 270, 272) by being formed as one piece of material with the side housings.

To assemble the fiber optic connector 210, the ferrule assemblies 232 are inserted in to the internal cavity 274 of the first side housing 270. In one embodiment, the ferrule assembles 232 are moved into the internal cavity 274 through the open side of the first side housing 270. The fiber guides 240 are inserted into the back post 224, the ferrules 234 are positioned to extend through the front openings of the first side housing 270 and the springs 252 are also positioned in the internal cavity 274. Each spring 252 may have to compressed in order to fit into the internal cavity between the flange 236 of the ferrule 234 and a portion (e.g., proximal facing surface) of the first side housing 270. In this embodiment, preferably, the ferrule assemblies 232 (e.g., ferrule 234, fiber guide 240 and spring 252) are assembled before placing the ferrule assemblies into the first side housing 270. After the ferrule assemblies 232 are positioned in the first side housing 270, the second side housing 272 is attached to the first side housing. The detents 276 secure (e.g., form a snap-fit connection between) the second side housing 272 and the first side housing 270. With the fiber optic connector 210 now assembled, the fiber optic connector can be attached to the end of a fiber optic cable 12 as described herein.

Figure 19:
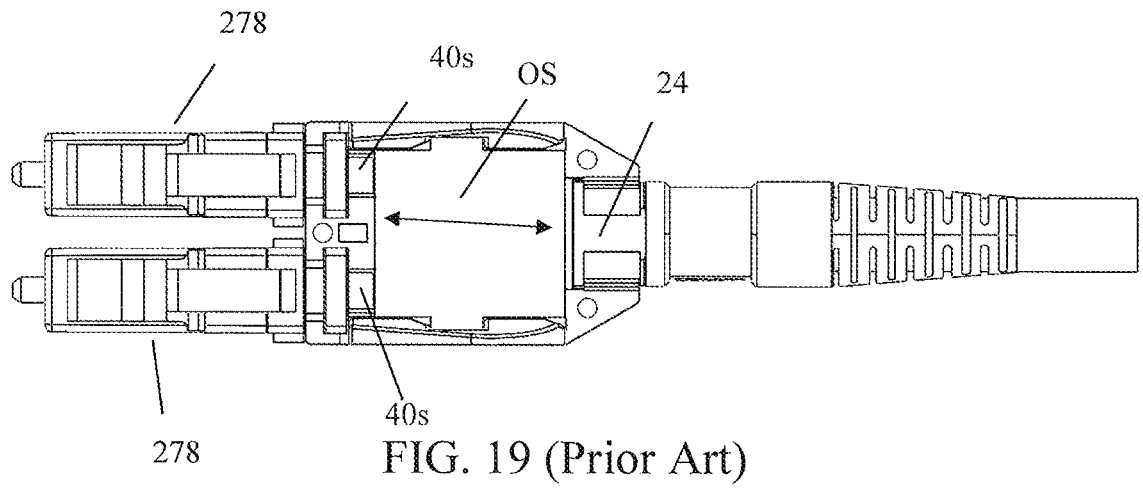
FIG. 19 is a cross section of a prior art fiber optic connector with short guide tube without incoming optical fiber.
Figure 20:
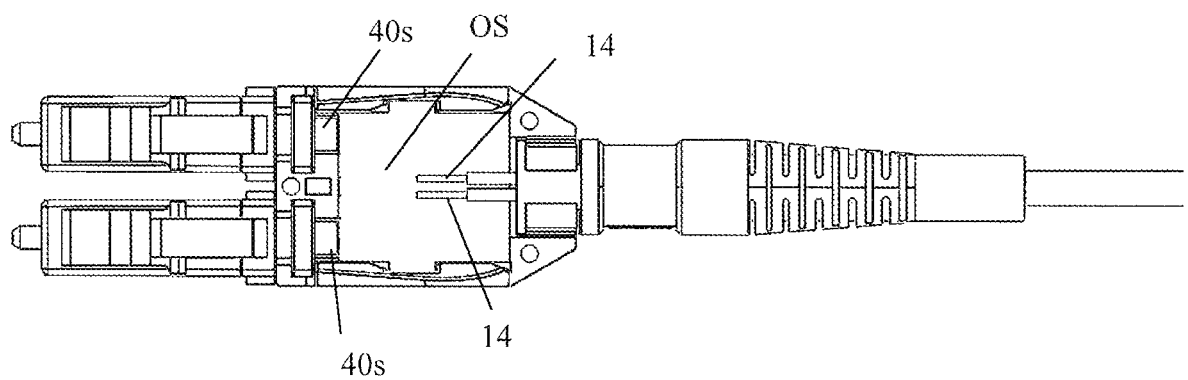
FIG. 20 is a cross section of the fiber optic connector of FIG. 19, with incoming optical fibers entering a cavity within connector housing.
Figure 21:
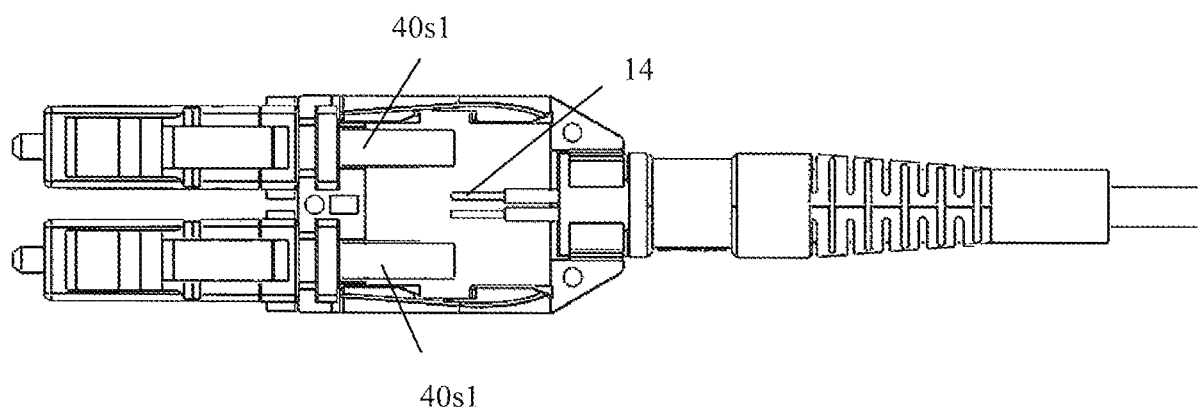
FIG. 21 is a cross section of the fiber optic connector of FIG. 19 with longer guide tubes and incoming optical fibers.

FIG. 19 depicts a prior art fiber optic connector with plug frames (278) securing optic ferrule assemblies. Short guide tubes (40*a*) extend into an OS or open space formed by the upper housing and lower housing of the fiber optic connector. FIG. 21 depicts extending the guide tubes (40*s*1) within cavity (OS), and incoming optical fibers (14) still cannot be guide into the open proximal end of the guide tubes. FIG. 20 illustrates there is way the optical fibers can be inserted into the proximal open end of the guide tube, as the fibers (600 nm-900 nm) in diameter cannot be accessed and inserted into the guide tube. In the connectors of FIG. 19, FIG. 20 and FIG. 21, a top housing (not shown) prevents the assembly process (even of automated) to visualize or access the incoming optical fibers (14) to ensure the optical fiber enters a proximal open end of the guide tube, then into a bore of the ferrule to complete the optical pathway of the connector.

Figure 22:
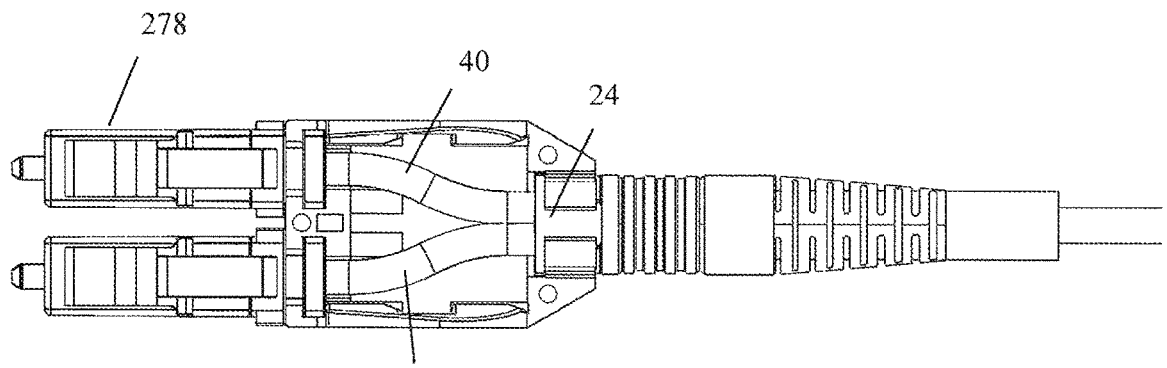
FIG. 22 is a cross section of another fiber optic connector with extended guided tubes within a proximal open end of the back post.
Figure 23:
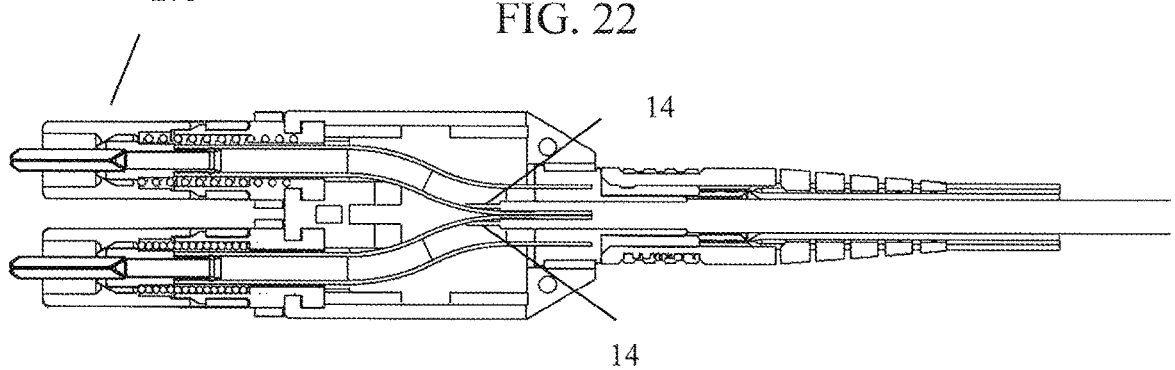
FIG. 23 is a cross section of the fiber optic connector of FIG. 22 without the guide tubes illustrated within proximal open end of the back post.
Figure 24:
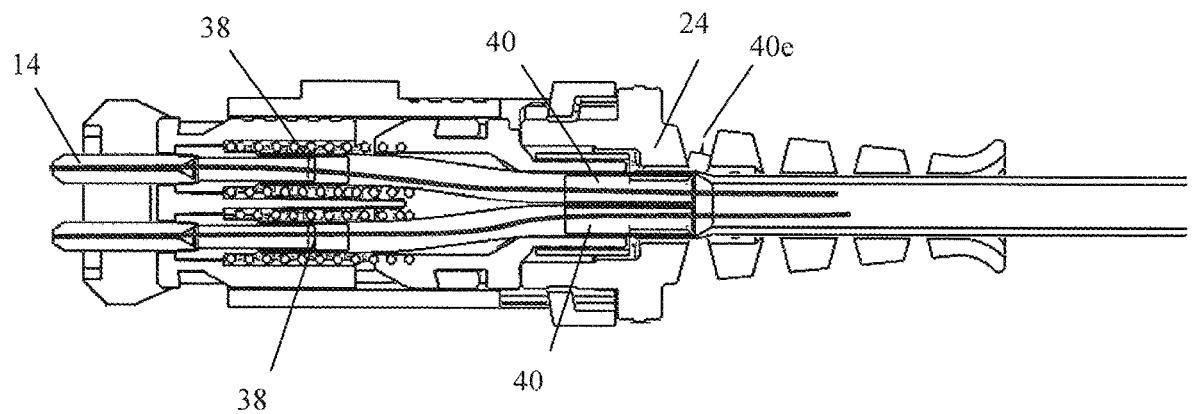
FIG. 24 is a cross section of another fiber optic connector with guide tube slightly beyond proximal open end of the back post.
Figure 25:
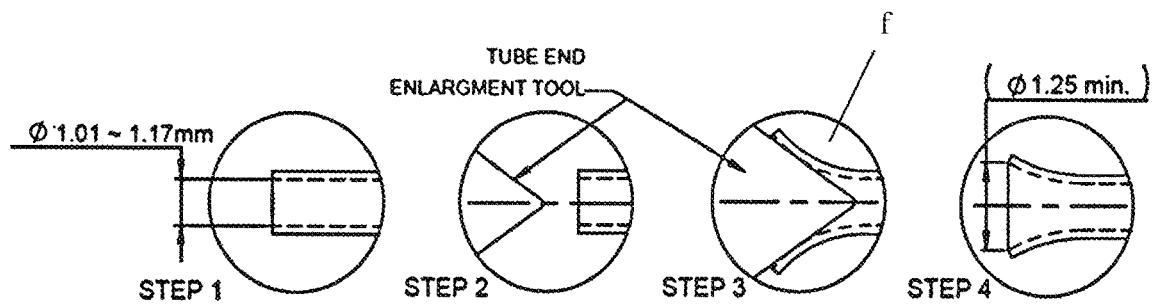
FIG. 25 depicts the steps of flaring a leading edge of the guide tube.
Figure 26:
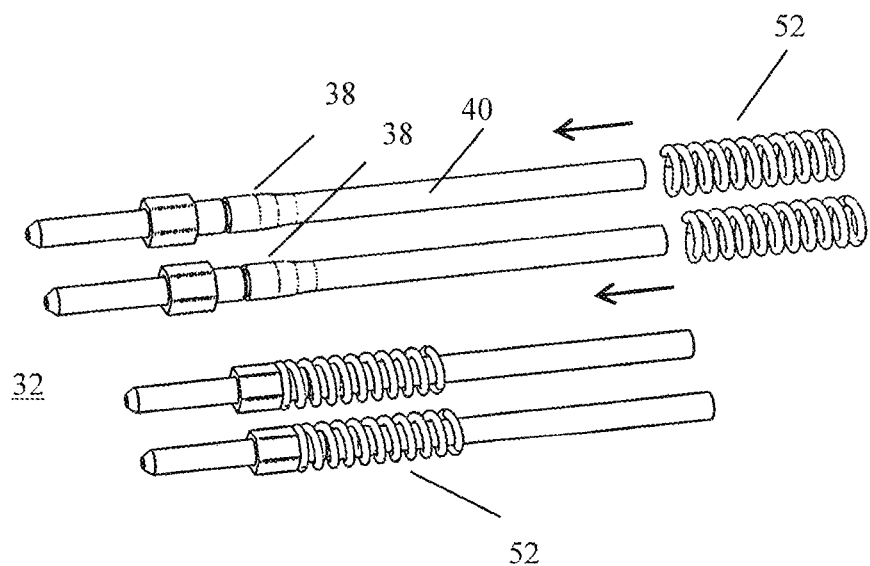
FIG. 26 an exploded view of securing a bias spring with the ferrule assembly.

FIGS. 22-24 illustrate guide tubes 40 providing blind mating or pathway to guide the optical fibers 14 into the bore of each ferrule assembly, as shown in FIG. 24. FIG. 23 shows the optical fibers just being inserted simultaneously to avoid breakage or micro-fractures of the optical fiber. FIG. 24 shows guide tubes extended 40*e* slightly beyond the proximal open end 24 of the back post. The user inserting a flexible cannula, may catch the guide tube at the proximal open end of the back post and deposit a small amount of epoxy, which would interfere with the insertion of the optical fiber through the bore of the ferrule assembly. The optical fibers need to move along the inner diameter of the guide tube until reaching the ferrule bore, and the optical fibers is then secured with the epoxy to form the optical fiber connector. FIG. 25 illustrates the steps of using an enlargement tool 80 that flares the leading edge opening of the guide tube 40. The flare "f" increases the guide tube so it can be installed over rib 38. FIG. 26 depicts bias springs held about rig 38 to avoid falling off during assembly.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fiber optic connector subassembly, comprising:
    a housing;
    at least two optical ferrule assemblies supported by the housing;
    a back post having an open proximal end;
    a bias spring assembly arranged to bias the at least two optical ferrule assemblies in a forward direction;
    a guide tube for each of the at least two optical ferrule assemblies, each guide tube extending from a proximal end of a respective one of the at least two optical ferrule assemblies to distal end of the fiber optic connector subassembly; and wherein
    the guide tubes extend substantially to the open proximal end of the back post thereby allowing optical fibers to be inserted into respective ones of the guide tubes at the proximal end of the back post, along the guide tubes and into respective ones of the at least two optical ferrule assemblies to form the fiber optic connector subassembly.

2. The pre-assembled fiber optic connector subassembly of claim 1 wherein the post is oblong in cross section.

3. The fiber optic connector subassembly of claim 2 wherein the post further comprises an opening having an oblong cross section.

4. The fiber optic connector subassembly of claim 3 wherein the post is configured to secure a strain relief boot.

5. The fiber optic connector subassembly of claim 1 wherein the housing comprises an open side body, the at least two ferrule assemblies and the bias spring assembly being at least partially received in the open side body, the open side body including opposite recesses nearer a proximal end of the open side body and opposite openings nearer a distal end of the open side body.

6. The fiber optic connector subassembly of claim 1 wherein the post has opposing flats to reduce the overall dimensions of the fiber optic connector subassembly.

7. The fiber optic connector subassembly of claim 2 wherein the oblong post has opposing flats to reduce the overall dimension of the fiber optic connector subassembly.

8. The fiber optic connector subassembly of claim 1 wherein an injector port is configured to receive a flexible cannula for injecting an epoxy to secure the mating of the optical fiber with the respective ferrule assembly.

9. The fiber optic connector subassembly of claim 8 wherein the injector port is defined by the guide tube.

10. The fiber optic connector subassembly of claim 1 wherein the guide tubes are located closer together in the back post than in the housing.

11. The fiber optic connector subassembly of claim 10 wherein the guide tubes are bent along their lengths.

12. The fiber optic connector subassembly of claim 11 wherein the guide tubes are pre-formed with a bend.

13. The fiber optic connector subassembly of claim 10 wherein the guide tubes are flexible.

14. The fiber optic connector subassembly of claim 1 wherein the guide tubes extend slightly beyond the open proximal end of the back post.

15. The fiber optic connector subassembly of claim 1 wherein an inner surface of the open proximal end of the back post further comprise a raised surface for keeping separate the two guide tubes during assembly.

16. The fiber optic connector subassembly of claim 1 wherein each optical ferrule assembly further comprises a rib nearer a distal end of the assembly, the rib accepts and secures a flared portion of the guide tube, and further wherein the rib holds the bias spring on the distal end of the assembly.

17. A method of assembling a pre-assembled fiber optic connector, comprising:
    providing the fiber optic connector subassembly of claim 1;
    inserting a flexible cannula into each guide tube through the back post so that the cannula is guided by the guide tube toward the respective ferrule subassembly; and
    injecting from the flexible cannula epoxy into each ferrule subassembly for securing the optical fibers to form an optical communication path.

* * * * *